Figure 3:
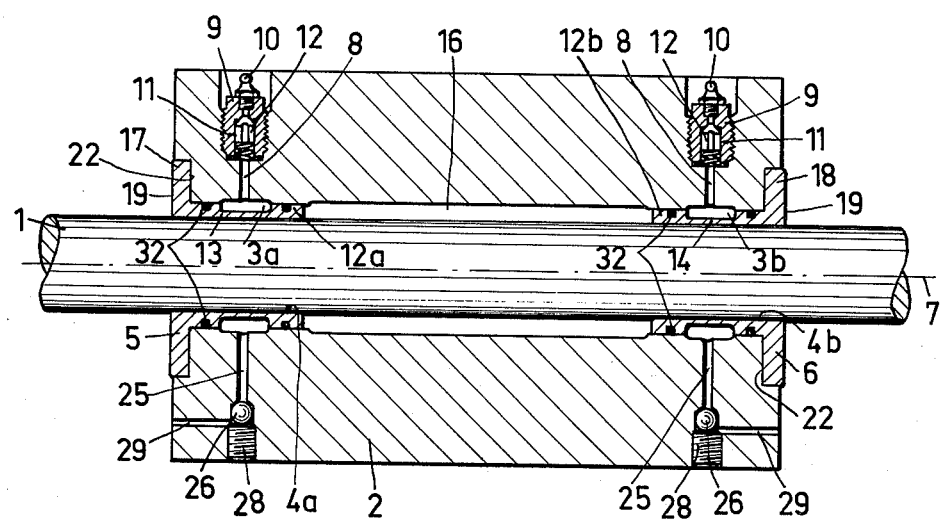

United States Patent [19]

Betzler

[11] 3,917,422

[45] Nov. 4, 1975

[54] DEVICE FOR CENTERING A ROTARY TOOL BODY ON A DRIVE SHAFT

[75] Inventor: Otto Betzler, Tauberbischofsheim, Germany

[73] Assignee: Michael Weinig KG, Tauberbischofsheim, Germany

[22] Filed: Aug. 2, 1974

[21] Appl. No.: 494,343

[30] Foreign Application Priority Data

Aug. 17, 1973 Germany............................ 2341663

[52] U.S. Cl. ...................... 403/15; 51/168; 83/665; 144/218
[51] Int. Cl.[2] ...................... F16D 1/06; B27G 13/00
[58] Field of Search ...... 144/218, 230; 83/501, 665, 83/698, 304; 51/168, 169; 403/15, 34, 36, 37

[56] References Cited
UNITED STATES PATENTS

| | | | |
|---|---|---|---|
| 2,801,694 | 8/1957 | Schneider et al................. | 83/698 X |
| 3,073,198 | 1/1963 | Clem.................................. | 83/665 X |
| 3,285,679 | 11/1966 | Balsiger ............................: | 51/168 X |
| 3,782,234 | 1/1974 | Rodach............................. | 83/698 X |

*Primary Examiner*—Donald R. Schran
*Assistant Examiner*—W. D. Bray
*Attorney, Agent, or Firm*—Walter Becker

[57] ABSTRACT

A rotary tool body has a central bore for receiving a support and drive shaft. At least one sleeve in the central bore surrounding the shaft is sealed at the ends in the bore and between the sealed ends includes at least one radially deformable axial region. Passages in the tool body provide for the supply of flowable pressure medium to the central bore around the deformable axial region to deform the axial region radially into engagement with the shaft and for the release of the pressure medium from the central bore.

18 Claims, 4 Drawing Figures

Fig.1
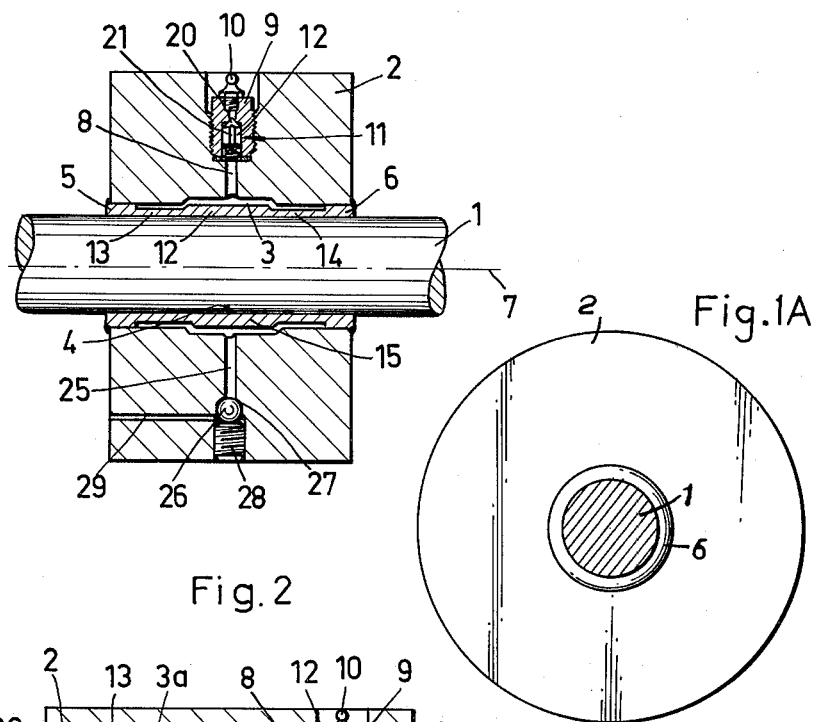
Fig.1A
Fig.2
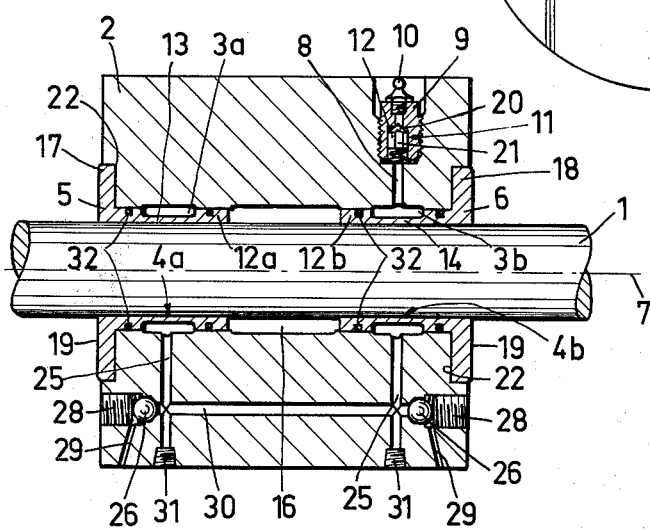

DEVICE FOR CENTERING A ROTARY TOOL BODY ON A DRIVE SHAFT

When working wood for instance by millers or cutter heads with insertable blades, small chipping forces are encountered in comparison to the machining of metal. Therefore, such woodworking tools can operate at considerably higher circumferential speeds than corresponding metal machining tools. Therefore, such woodworking tools have as a rule at considerably higher rotational speeds, greater radial dimensions. The thus obtained increase in the circumferential speed of the woodworking tools, however, bring about that already minor unbalances result in considerable radial forces and deformations. Such unbalances are caused in particular by a non-precise central seating of the tool on the driving shaft. For purposes of obtaining as precise and play-free seat of the tool as possible on the driving shaft, the bore and the shaft are manufactured according to one and the same fitting system. The bore is prepared in conformity with German Industrial Standards D.I.N. fittings H-7 and the shaft is prepared according to German Industrial Standards D.I.N. fittings G-6. With customary bore and shaft diameters, which concern a diameter between 30 and 50 mm, a fitting play of up to 0.05 mm may be obtained.

This fitting play brings about that the blades of tools which, as customary, were sharp ground on a special tool grinding machine outside the woodworking machine will, when placed on the driving shaft of the woodworking machine not be precisely true any longer, but will have a deficiency as to trueness due to the fitting play. In view of the high speeds of the tool of frequently in excess of 10,000 revolutions per minute, this deficiency in thickness may even further considerably be increased by the unbalance due to the fitting play so that in the end with a multi-blade tool actually only one protruding blade works, whereas the other blades which are radially further inwardly will due to the deficiency in trueness no longer be active or effective. As a result thereof, even with a highly precise and modern working machine, the feeding speed will depend on the trueness of the blades left to chance and the number of the fully effective blades which number is reduced by the deficiency in trueness. Similarly, with a machine having a plurality of driving shafts and tools, that tool will have the permissible advancing speed which has the greatest deficiency in trueness.

Thus, a deficiency in trueness forces to effect a drastic reduction in the feed advancing speed of the tool when a required surface quality of the wood to be machined has to be maintained because only the blade which due to the lack of trueness protrudes radially farthest outwardly will be effective and useful.

For purposes of reducing this deficiency in trueness it has been known for a long time to fasten the tool to the driving shaft not only by means of exclusively axially chucking elements but also with radially chucking elements such as conical bushings or the like. In this way a centering of the tool is to be brought about. Since, however, also the conical bushings have manufacturing tolerances concerning the bore as well as the cone, it is not possible with such a chucking of the tool to obtain the precision trueness as it is required in order to obtain an effective increase in the feeding or advancing speed.

Since thus a play-free exacting centering mounting of the tool on the driving shaft was not obtainable, other ways and means have become known in order to eliminate the lack of trueness in high-speed rotating woodworking tools. In this connection, the deficiency in trueness is suggested to be eliminated by a post machining directly on the tool chuck on the driving shaft of the machine and carried out with the tool rotating at the speed at which the tool is expected to rotate in actual operation. With this method which is frequently designated as "jointen" method, the tool which has been sharpened or honed on a tool-grinding machine is during its running in the machining machine machined by a grinding stone which is either built into the machine or can be separately connected thereto, and on which the tool blades are passed by until all blades have a so-called round or true phase, in other words until also that blade which due to the lack of trueness is located radially farthest inwardly, is engaged by the grinding stone.

While tools post machined in this way, due to the change at the blades, will with moist wood and with transverse growth within the year rings or growth rings have a rough surface which must be post machined, it is possible in view of the elimination of the lack in trueness to operate at a considerably higher feeding speed, but the lifetime of such machined tool is considerably reduced. The reason for this phenomenon is due to the partial elimination of the clearance angle behind the blade as it is caused by the truing phase because that portion of the cutter blade tip which is located outside a certain radius is taken off by the grinding stone. In this way, the lifetime of a cutter blade may drop to less than one half of the normal lifetime when the length of the truing phase measured in circumferential direction, in other words, the length of the base of the portion of the cutter blade tip taken off by the grindin stone amounts to only ½ mm. Therefore, the elimination of a relatively great error in the true shape of the tool by such post machining brings about a corresponding reduction in the life of the tool. While it is principally possible with cutter heads having insertable blades, by a corresponding expense for a precise insertion of the blades, to keep the truing phase during the post machining in the machining machine at the cutter blades within tolerable limits, nevertheless in this way the preparing time is rather long which upsets the obtained gain in the lifetime of the tool.

In addition to the automatic reduction in the lifetime of the tool, also the post machining of the described type on the machine itself increases the time of preparation and setting of the machine and consequently reduces the actual running time of the machine so that the possibly increased feeding or advancing speed does not bring about any economy even under favorable conditions. In this connection it may also be mentioned that such post machining of the tool in the machining machine tool itself at best brings about an eceonomic gain only when the tool is used uninterruptedly in a series up to the end of its life and remains chucked in the machine tool. If the tool with small series or with intermediate resetting of the machine has to be transported to other tools of the machine tool, a new post machining will be necessary when it is again chucked because in each chucking position other tolerances as to the true contour are required. Such multiple post machining of the tool in the machine tool would increase the setting time in an inadmissible manner.

It is, therefore, an object of the present invention to provide a woodworking tool of the above mentioned general type in which a proper trueness of the cutting blades will be assured without additional post machining in the machine tool itself.

These and other objects and advantages of the invention will appear more clearly from the following specification in connection with the accompanying drawings, in which:

FIG. 1 diagrammatically illustrates in section a woodworking tool according to the invention.

FIG. 1A shows a plan view of one end of the tool of FIG. 1.

FIGS. 2 and 3 respectively illustrate modifications of the invention.

The rotary tool for woodworking machines according to the present invention is characterized primarily in that in the wall of the receiving bore, similar to a so-called shrink chuck, at least one annular pressure chamber is provided which is separated from the inner surface of the receiving bore by an elastically deformable mantle, said pressure chamber being adapted to be filled with a pressure fluid which in its turn is adapted to be subjected to pressure by a pressing operation.

When the mantel is subjected to pressure by the pressure medium, which is substantially an incompressible pressure medium, the mantle will with completely uniform pressure engage the surface of the driving shaft so that any remaining play between the inner surface of the receiving bore and the circumference of the shaft is bridged and an exact automatic centering of the tool on the driving shaft is effected which will assure a proper trueness. By eliminating or at least to a major extent, reducing any lack of trueness, all tool blades will become fully effective and can be taken advantage of for the respective machining operation so that maximum advancing speed can be applied in conformity with the surface quality and the available number of blades. The tool blades may be machined on a special tool grinding machine so that optimum working conditions will be obtained and also with damp or moist wood, and with transverse growth, a clean, smooth cut will be obtained. Inasmuch as the complete machining of the tool blades may be effected outside the machine tool, the setting period for the machine tool merely comprises the chucking of the tool so that the machine tool can be operated with a minimum of idling or stopping times. The useful running period of the machine tool is increased further by the fact that also the lifetime of the tool will in no way be affected because the tool blades are ground on the special tool grinding machine with a clearance angle, and no deviations whatsoever from the optimum blade for realizing trueness will be necessary. Also a frequent change of the tools with smaller series or with resetting in the series merely involves the additional time necessary for the simple tool exchange. According to a particularly advantageous embodiment of the invention, a viscose grease is employed as pressure medium. A particularly safe and inexpensive design of the chucking device is realized by providing in the tool body, preferably in a bore communicating with the pressure chamber, a check valve which is equipped with a high pressure lubricating nipple. If desired, a commercially customary high pressure lubricating press may be connected to the high pressure lubricating nipple. Such press would then through the check valve and the bore press grease into the pressure chamber while the check valve prevents a return flow of the grease. The degree of pressure at which the elastically deformable mantle of the tool engages the surface of the drive shaft, can be read at a pressure gauge of the high pressure lubricating press.

A particularly simple design of the high pressure lubricating nipple equipped with a check valve is obtained when for purposes of obtaining a pressure relief for withdrawing the tool, a disengageable separate closure member is provided in a second bore which communicates with the pressure chamber. A particularly simple closure of this second bore which closure is safe in operation is obtained by the closure being adapted by means of a closure screw preferably guided in a thread of the bore, to be pressed against its sealing seat. Expediently, the closure body is in the form of a steel ball which cooperates with a conical annular surface forming the sealing seat. Between the closure body and the closure screw, there is provided the mouth of a discharge bore for the discharge pressure medium so that special discharge possibilities within the region of the closure screw are not required.

Inasmuch as the placing of the mouthpiece of the high pressure lubricating press upon the high pressure lubricating nipple is effected very carefully, it will be appreciated that for obtaining the clamping seat for the tool onto the drive shaft, merely a short manual operation is necessary by means of which a precisely centered seat of the tool on the drive shaft will be obtained. For purposes of removing the tool, merely a slight turning of the closure screw is necessary whereby the grease under pressure above atmospheric pressure lifts the closure body designed as steel ball off the sealing seat and grease is discharged through the lateral closure bore arranged in front of the closure screw, until the over pressure in the pressure chamber has dropped to normal pressure. The quantity of grease being discharged is low and usually is with customary dimensioning of the pressure chamber far below 1 cm$^3$. The discharge quantity of grease is during the subsequent chucking operation again replaced by the high pressure lubricating press.

Thus, with each chucking operation of the chuck, new grease is fed in, whereas with the removal of the tool from the driving shaft, old grease escapes, particularly when the second bore which contains the closure body leads to a place of the pressure chamber which place is located opposite to the mouth of the first bore, the important advantage is realized that without any additional steps, a continuous renewal of the pressure medium, preferably grease, occurs, and a harmful aging of pressure medium entrapped in the pressure chamber will be avoided.

In order safely to prevent a wabbling or tumbling of the tools on the driving shaft, it is according to a further development of the invention provided that in the direction of the axis of rotation, adjacent to each other there are provided a plurality of, especially two annular regions of the mantle preferably designed as separate part, which ranges are supported by the circumference of the drive shaft. In this way, if the mantle is under pressure, two annular pressing zones form which are spaced from each other and which will also be able safely to absorb the forces in the direction of the axis of rotation.

It is particularly advantageous to safeguard and secure a tool according to the invention additionally on radially extending end surfaces by axial chuck elements. After the tool has been placed upon the drive shaft, first the pressure in the pressure medium is built up so that the elastically deformable ranges of the mantle are pressed uniformly against the drive shaft, and the tool will while centering relative to the drive shaft be aligned. In this position, the tool is additionally safeguarded or secured by the additional axial chucking elements while forces can be exerted on the tool only in the axial direction but not in radial direction.

In order to avoid that the exact centering of the tool relative to the drive shaft by pressure on the mantle, that surface of the mantle which is adjacent to the drive shaft and extends into those axial ranges which in response to occurring pressure are not pressed against the shaft circumference under elastic deformation, are set off the shaft surface. In this way, only those ranges of the mantle will get into contact with the shaft surface which are involved in the elastic deformation. On the other hand, those other ranges of the mantle which are offset from the shaft surface permit curve movements of the tool relative to the drive shaft.

Referring now to the drawings in detail, the arrangement shown in FIG. 1 comprises a drive shaft 1 of a woodworking machine. Chucked to said drive shaft 1 is a machining tool which comprises a tool body 2, equipped with cutting blades not described in detail. Provided in the tool body 2 is a pressure chamber 3 which is filled with grease forming a substantially noncompressible pressure medium. This pressure chamber 3 is toward the drive shaft 1 closed by a mantle 4 which within its axial outer ranges 5, 6 is tightly connected to the tool body 2, for instance by welding. The grease in pressure chamber 3 fills a bore 8 which extends radially with regard to the axis of rotation 7. Screwed into the thread of bore 8 is a closure body 9 which is equipped with a high pressure lubricating nipple 10 accessible from the outside of the tool body 2. Between the high pressure lubricating nipple 10 and the bore 8 there is a check valve 11 arranged in the closure body 9, which checkvalve has a spring loaded closing cylinder 12. This cylinder 12 is with a conical tip pressed against an associated conical sealing seat 20 and in its cylindrical portion has on its surface transfer passages 21 for the grease. In view of the design of the closure body 12 of the check valve 11, it will be assured that when the check valve 11 closes, no suction effect can occur so that the grease in the pressure chamber 3 will after removal from the high pressure lubricating press from the lubricating nipple 10 be placed under pressure indicated by the pressure gauge of the high pressure lubricating press.

The mantle 4 which closes the pressure chamber 3 toward the drive shaft 1 is in the central region of its axial extension provided with a reinforced mantle region 12. Between said mantle region 12 and the two axial outer ranges 5 and 6 elastically deformable mantle regions 13 and 14 are provided which are under the pressure of the pressure medium. The mantle regions 13 and 14 are located at the same axial distance from the bore 8 which communicates with the high pressure lubricating nipple 10 so that in combination with the design of the pressure chamber 3 symmetrical with regard to the bore 8, it will be assured that both mantle regions will always independently of possible throttling losses or the like be subjected to the same pressure due to the pressure acting upon the elastically deformable mantle regions 13 and 14, these mantle regions will while bridging any possible play firmly engage the circumferential surface of the drive shaft 1 while by means of the uniform pressure distributed over the circumference of the drive shaft 1, an automatic centering of the tool body 2 will be realized.

As the result of the above, a corresponding pressing-on of the reinforced central portion 12 will be assured because this part 12 is held merely by the weakened elastically deformable mantle regions 13 and 14. In order to avoid the formation of two discrete annular pressure zones with the elastically deformable mantle regions, and to assure a single central pressure zone with lower safety against tumbling movements of the tool body 2, that surface of the reinforced mantle region 12 which faces toward the drive shaft 1 is provided with a turn-in area 15 of less depth so that this surface is offset from the circumference of the shaft. Similar recesses may be provided in the axial outer range 5 and 6 of the mantle 4 and more specifically in those parts of said outer ranges 5 and 6 which are not covered by the elastic deformation in the mantle regions 13 and 14, so that slight radial curve displacements are possible which when the mantle regions 13 and 14 are subjected to pressure may occur for a precise centering of the tool body 2 on the drive shaft 1.

The illustrated radial arrangement of the bore 8 communicating with the high pressure lubricating nipple 10 is advisable because the tool and thus the threaded bolt or nipple 10 are accessible from the circumference of the tool independently of the location of the tool in the machining machine tool. With milling tools equipped with many cutting blades, the accessibility of the high pressure lubricating nipple 10 may be impeded by the cutting arrangement. In such an instance the situation may be helped by replacing the radial bore 8 by a bore which extends parallel to the axis of rotation 7 and receives the high pressure lubricating nipple. This last mentioned bore communicates if desired through a radial conduit with the pressure chamber 3. The high pressure lubricating nipple 10 will then engage an end face of the tool body 2, so that said end face must be freely accessible when chucking the tool. In order to be able also in such an instance to chuck the tool in any working position in the working machine, for instance on a drive shaft located above the work table as well as after a rotation by 180° on a second drive shaft below the work table, it is possible instead of two independent bores, to extend the bore extending parallel to the axis of rotation 7, from one end face of the tool body 2 to the oppositely located end face and to close said last mentioned bore at each end face of the tool body 2 by means of a closure body 9.

Principally it would be possible within the region of the closure body 9 to provide means for pressure relief for purposes of withdrawing the tool. According to a preferred embodiment of the present invention, however, a second bore 25 communicates with the pressure chamber 3 which bore 25, similar to bore 8 extends radially with regard to the axis of rotation 7. The bore 25 is closed by means of a closure body 26 designed as steel ball, to which end the closure body 26 cooperates with a sealing seat 27 designed as conical annular surface on the outer mouth of bore 25. The closure body 26 is held in its closing position by a closure screw 28 which is designed as a set screw and which is screwed into a thread of a widened end portion of bore 8. When the closure screw 28 is rotated so as to move to a slide outwardly from the tool body 2, the grease in the pressure chamber 3 and the bore 25 presses the closure body 26 away from its seat 27 so that an escape gap opens for the grease through which the grease can pass to the back side of the closure body 26 provided with radial play. Between the closure body 26 and the closure screw 28 there is located the mouth of a discharge bore 29 which extends transverse to bore 25 and through which the grease being discharged passes into the open. In this way, the creation of a discharge within the region of the closure screw 28 will not be necessary so that for this purpose a commercially obtainable set screw or the like can be used.

For the arrangement of the closure body 26 and in particular of the closure screw 28 the same principles apply as to the accessibility thereof, as these have been discussed in detail above in connection with the lubricating nipple 10. In connection with the embodiment of FIG. 2, there is designed an arrangement of an additional bore 30 which is parallel to the axis of rotation 7 and which crosses with a blind closed bore 25 while in the extension of bore 30 has arranged closing body 26 and closure screws 28 at the end faces of the tool 2. According to an important feature of the invention, the bore 25 leads to a portion of the pressure chamber 3 which portion is located opposite the mouth of bore 8 so that during the chucking and unchucking operations of the tool body 2 a continuous renewal of the grease occurs in the pressure chamber 3 so that harmful aging processes are avoided. This, of course, has a decisive importance for other pressure media than grease.

FIGS. 2 and 3 illustrate modified embodiments which differ from the embodiment of FIG. 1 primarily by an employment of a two-sectional mantle 4. For purposes of improving the illustration, corresponding elements in both figures have been designated with the same reference numerals. Each part 4a, 4b of the mantle 4 has with the embodiment of FIG. 3 associated therewith an annular pressure chamber 3a, 3b of its own. This pressure chamber is in a manner similar to that of FIG. 1 closed by a closure body 9 and 26. The pressure chambers 3a and 3b are, as also shown in FIG. 2, in their axial dimension limited to the reduced elastically deformable mantle regions 13 and 14 but for purposes of bringing about a pressure equalization are connected to each other as indicated in FIG. 2 by the bore 30. As has been furthermore illustrated in FIG. 2, instead of two bores 8 with closure bodies 9 and pertaining check valves 11 and high pressure lubricating nipples 10 corresponding to the embodiment of FIG. 1, there is merely such bore 8 provided which through bore 30 is in communication with the two pressure chambers 3a and 3b.

With the embodiment of FIG. 3 which shows a tool body of large axial width, for instance for large planing widths a communication between the two pressure chambers 3a and 3b has been omitted since in view of the great widths of the tool body, such connection would have to bridge a considerable distance and due to the throttling losses and the like occurring in such an instance, an exact uniform pressure build-up in the pressure chambers 3a and 3b could not safely be assured. In order in such an instance of two pressure chambers 3a, 3b completely separated from each other, to assure as uniform pressure build-up as possible, with this embodiment a high pressure grease press is employed for chucking on the driving shaft 1, which press has two outgoing high pressure hoses, one each for each of the two lubricating nipples 10.

With the embodiment according to FIGS. 2 and 3, instead of a reinforced central region 12 of the mantle 4, there is provided a limited separating gap 16 which is confined by two reinforced ends 12a, 12b of the mantle sections 4a and 4b. This separating gap 16 extends according to FIG. 3 over a considerable portion of the axial length of the tool body 2. The ends 12a and 12b of the mantle directly engage with their radial outer surface the tool body 2 and thus are not acted upon by the pressure medium. Nevertheless, also the end portions 12a, 12b may communicate with a recess which corresponds to the recess 15 of the reinforced intermediate region 12 according to FIG. 1, similar to the axial outer ranges 5 and 6, in order outside the sphere of influence of the deformation of the mantle regions 13 and 14 to avoid a firm engagement of the mantle 4 with the circumference of the drive shaft 1. At their axial outer regions 4 and 5, the mantle parts 4a and 4b designed as separate flange bushings have radially outwardly angled off flanges 17 and 18 which have end faces 19 located in a plane perpendicular to the axis of rotation 7. Advantageously, the flange bushings forming the mantle parts 4a and 4b are pressed into the receiving bore of the tool body and are screwed at their flanges 17 and 18 to the tool body 2 in a manner not illustrated in detail. The flanges 17 and 18 are toward the tool body 2 supported by rear supporting surfaces 22 which are parallel to the end face 19. The flanges 17 and 18 project with their end faces 19 axially beyond the end face of the tool body 2. Due to such a design, an additional axial chucking of the tool on the drive shaft 1 at the mantle parts 4a and 4b is made possible without forces occurring in radial direction which would interfere with the centering effected by the mantle regions 13 and 14. The axial clamping elements located adjacent to the tool body rest on the end faces 19 of flanges 12 and 18 and thus within the region of the rear supporting surfac 22 of flanges 17 and 18 bring about an additional seal against escape of pressure medium from the pressure chambers is additionally secured by O-rings 32 which are arranged on the outer surface of the cylindrical part of the mantel parts 4a and 4b at both sides of the respective pressure chambers 3a and 3b. Of course, also an additional clamping with axial clamping elements is also possible with the embodiment of FIG. 1. In such an instance, the axial clamping elements advantageously engage the end faces of the tool body 2 itself. Such additional axial clamping brings about an additional safety for connecting the tool to the driving shaft 1. However, at any rate, such additional axial clamping must be effected only through the intervention of precisely directed radially extending surfaces without the radial introduction of force and particularly only after the tool has been properly centered on the drive shaft 1. Such additional axial clamping brings about the possibility of designing the mantle and in particular its elastically deformable regions 13 and 14 practically exclusively in conformity with the requirement of a precise centering, without considering the problem of a frictional movement of the tool on the drive shaft 1. Accordingly, the reduced elastically deformable mantle regions 13 and 14 may be rather thin as to their wall thickness somewhat like a diaphragm in order to obtain a sensitive centering of the tool relative to the drive shaft which centering should be free as far as possible from superimposed stresses in the mantle 4. The drive shaft will then be fixed by additional clamping elements. In this way in spite of the precise centering a strong and safe connection of the tool to the drive shaft will be realized. This is furthermore aided by the fact that the drive shaft itself does not have to be weakened by structural features, especially for a centering.

It is, of course, to be understood that the present invention is, by no means, limited to the specific showing in the drawings, but also comprises any modifications within the scope of the appended claims.

What is claimed is:

1. A rotary tool member, especially for wood working machines, and adapted for mounting on a drive shaft; said tool member comprising a body having a central bore therethrough, sleeve means in said bore having an internal axial hole of uniform diameter for receiving the shaft, said sleeve means having axially spaced regions of sealing engagement with the bore in the body to define with the bore an annular chamber, said sleeve means comprising at least one radially deformable axial portion between said spaced regions, and means connected to said chamber for supplying a flowable pressure medium to said chamber thereby to deform said axial portion radially inwardly into pressure engagement with the shaft in the sleeve means.

2. A rotary tool member according to claim 1 in which said flowable pressure medium is fiscose grease.

3. A rotary tool member according to claim 1 in which said means connected to said chamber comprises a passage leading to said chamber through said body and including a check valve therein opening toward said chamber, said check valve adapted for connection to a high pressure lubricating device for supplying grease under high pressure to said chamber.

4. A rotary tool member according to claim 3 in which said check valve is a grease fitting having an inlet end near a surface of said body for engagement by said lubricating device.

5. A rotary tool member according to claim 1 in which said means connected to said chamber comprises a first bore in said body leading to said chamber and having a check valve therein opening toward said chamber, and a second bore in said body leading away from said chamber and having a selectively operable closure valve therein.

6. A rotary tool member according to claim 5 in which said closure valve comprises a ball, a seat in said second bore engageable by said ball, and a screw threaded into the body to press said ball toward said seat.

7. A rotary tool member according to claim 6 which includes an exhaust passage leading to the atmosphere from the side of said closure valve which faces away from said chamber.

8. A rotary tool member according to claim 5 in which said first and second bores are substantially diametrally opposed in respect of said chamber.

9. A rotary tool member according to claim 1 in which said sleeve means comprises a said radially deformable axial portion adjacent each said region of sealing engagement, each axial portion of the sleeve means being formed by a reduction in the radial thickness of the wall of the sleeve means along the respective axial portion.

10. A rotary tool member according to claim 9 in which said sleeve means comprising an axial section between said axial portions wherein the wall of said sleeve means is radially thicker than along said axial portions.

11. A rotary tool member according to claim 12 in which the difference in wall thickness of said axial portions and the axial section therebetween is formed into said sleeve means on the radially outer side thereof.

12. A rotary tool member according to claim 1 in which said sleeve means comprises a pair of sleeves in axially spaced relation in the bore in said body and each sleeve including a radially deformable axial portion and defining with said bore a closed chamber surrounding the respective axial portion.

13. A rotary tool member according to claim 12 which includes first means common to said chambers for supplying a high pressure flowable medium thereto and second means also common to said chambers for releasing the high pressure medium therefrom.

14. A rotary tool member according to claim 12 which includes first means for each said chamber for supplying a high pressure flowable medium thereto and second means for each chamber for releasing the high pressure medium therefrom.

15. A rotary tool member according to claim 12 in which said second means includes an axial bore in said body, and radial bores in the body leading from the respective chambers to said axial bore, and at least one selectively operable closure valve connecting said axial bore to the atmosphere.

16. A rotary tool member according to claim 1 which includes drive means on the shaft at the ends of the said body for transmitting driving power from the shaft to the body.

17. A rotary tool member according to claim 12 in which said sleeves are inserted in the central bore in the body at the opposite ends of the bore, each sleeve having a radial flange at the axially outer end larger in diameter than said central bore, said flanges adapted for engagement by clamping members on the shaft at opposite ends of said body.

18. A rotary tool member according to claim 12 in which said spaced regions of each sleeve comprise enlarged diameter portions formed on the sleeve near the opposite ends and closely receivable in said central bore, annular grooves in said enlarged diameter portions, and sealing rings mounted in said grooves and sealingly engaging the inside of said central bore.

* * * * *